(12) United States Patent
Yang et al.

(10) Patent No.: US 12,315,392 B2
(45) Date of Patent: May 27, 2025

(54) TRAINING METHOD AND SYSTEM FOR AUTISM LANGUAGE BARRIER BASED ON ADAPTIVE LEARNING SCAFFOLD

(71) Applicant: CENTRAL CHINA NORMAL UNIVERSITY, Hubei (CN)

(72) Inventors: Zongkai Yang, Hubei (CN); Lili Liu, Hubei (CN); Sannyuya Liu, Hubei (CN); Jingying Chen, Hubei (CN); Ceyu Deng, Hubei (CN); Jiaer Chen, Hubei (CN); Yutao Ling, Hubei (CN); Shulan Jin, Hubei (CN); Shengming Wang, Hubei (CN)

(73) Assignee: CENTRAL CHINA NORMAL UNIVERSITY, Hubei (CN)

( * ) Notice: Subject to any disclaimer, the term of this patent is extended or adjusted under 35 U.S.C. 154(b) by 37 days.

(21) Appl. No.: 18/334,371

(22) Filed: Jun. 13, 2023

(65) Prior Publication Data

US 2024/0355218 A1 Oct. 24, 2024

(30) Foreign Application Priority Data

Apr. 18, 2023 (CN) .......................... 202310416837.3

(51) Int. Cl.
G09B 7/00 (2006.01)
(52) U.S. Cl.
CPC ...................................... G09B 7/00 (2013.01)
(58) Field of Classification Search
CPC ........................................................ G09B 7/00
See application file for complete search history.

(56) References Cited

U.S. PATENT DOCUMENTS

| | | | | |
|---|---|---|---|---|
| 10,186,159 B2* | 1/2019 | Afshar | ..................... | G09B 7/00 |
| 11,188,848 B1* | 11/2021 | Carlin | ...................... | G06N 7/01 |
| 2004/0202987 A1* | 10/2004 | Scheuring | ................ | G09B 7/02 |
| | | | | 434/118 |
| 2006/0127871 A1* | 6/2006 | Grayson | .................. | G09B 7/04 |
| | | | | 434/350 |
| 2014/0170629 A1* | 6/2014 | Keim | ....................... | G09B 7/02 |
| | | | | 434/362 |
| 2017/0084190 A1* | 3/2017 | Devlin | ..................... | G09B 7/04 |

* cited by examiner

*Primary Examiner* — Eddy Saint-Vil
(74) *Attorney, Agent, or Firm* — JCIPRNET

(57) ABSTRACT

Disclosed are training method and system for autism language barrier based on adaptive learning scaffold, and the method includes the following steps: analyzing and assessing the state of the user before training to obtain an analysis result, and generating an initialized training path based on the analysis result; obtaining training question information, predicting a question-answering correct rate of the user based on user information and training question information, constructing a proximal development zone, and adding training questions that meet the accuracy requirements to the proximal development zone; updating the initialized training path, classifying the training questions in the proximal development zone, adding the classified training questions to the main training task or branch training task, and the user will perform learning and training according to the training task. The disclosure may recommend a suitable training path, and formulate training tasks that are suitable for the user's ability level.

9 Claims, 5 Drawing Sheets

TRAINING METHOD AND SYSTEM FOR AUTISM LANGUAGE BARRIER BASED ON ADAPTIVE LEARNING SCAFFOLD

CROSS-REFERENCE TO RELATED APPLICATION

This application claims the priority benefit of China application serial no. 202310416837.3, filed on Apr. 18, 2023. The entirety of the above-mentioned patent application is hereby incorporated by reference herein and made a part of this specification.

BACKGROUND

Technical Field

The present disclosure relates to educational informatization field, and more specifically, to a training method and system for autism language barrier based on adaptive learning scaffold.

Description of Related Art

Adaptive teaching refers to the educational intervention aimed at the individual differences among students in the teaching process, and helps different students learn the required knowledge and skills in the teaching process. According to the Scaffolding Theory, teachers need to pay attention to the main activities of students in teaching, intervention in the learning process and provide appropriate learning scaffolds when necessary, and provide students with more opportunities for independent learning and exploration when intervention is not necessary. Adaptive learning scaffold is established based on the concept of learning scaffold, focusing on the individual characteristics of students, and providing them with personalized and adaptive scaffold strategies in teaching activities. Adaptive learning scaffold is able to provide appropriate learning content for the next stage when learners respond correctly to the content to be learned, and also give adaptive prompt information when learners respond incorrectly to the content to be learned. In this process, learners are able to manage and control their own learning tasks and learning progress through adaptive learning scaffold, and gradually learn to adjust appropriate learning scaffold for themselves, and eventually become independent learners.

Because children with autism are different from normal people in the development of cognitive, thinking, and social abilities, they have distinctive language barriers and the differences between them are significant. Accordingly, in the training games, providing suitable learning scaffold of suitable level for children with autism is particularly important.

Based on the adaptive learning scaffold, by focusing on the individual characteristics of children with autism, monitoring their behaviors in games, diagnosing their ability conditions, and actively providing children with appropriate process feedback and intervention training games suitable for their learning ability level, it is possible to help children with autism to feel less frustrated and uncertain in the process of playing games for training, and effectively avoid children's surprise and disappointment, while better maintaining the interest and concentration of children with autism, thereby achieving better intervention and training effects.

With the continuous development and application of information technology, the adaptive intervention in the language barrier training games for children with autism is able to be implemented correspondingly. However, in the existing language barrier training games for children with autism, the problems are: the existing methods have insufficient intelligence for providing training tasks and training questions, it is difficult to meet the requirement of adaptive intervention and personalized training, and negative effects caused by mismatched learning abilities of children with autism during training are ignored.

SUMMARY

In view of the above defects or needs for improvement of the related art, the present disclosure provides a training method and system for autism language barrier based on adaptive learning scaffold, which are able to meet users' needs for adaptive intervention and personalized training, while preventing negative effects caused by mismatched learning abilities of patients with autism during training.

In order to achieve the above purpose, according to the first aspect of the present disclosure, a training method for autism language barrier based on adaptive learning scaffold is provided, the method includes the following steps: analyzing and assessing the state of the user before training to obtain an analysis result, and generating an initialized training path based on the analysis result; obtaining training question information, predicting a question-answering correct rate of the user based on user information and training question information, constructing a proximal development zone, and adding training questions that meet the accuracy requirements to the proximal development zone; updating the initialized training path, classifying the training questions in the proximal development zone, adding the classified training questions to the main training task or branch training task, and the user will perform learning and training according to the training task.

Further, in the training method for autism language barrier based on adaptive learning scaffold, the step of constructing the proximal development zone includes: pre-setting a value range of the question-answering correct rate, if the correct rate of the training question answered by the user falls within the value range, the training question will be added to the proximal development zone; if the correct rate of the training question answered by the user does not fall within the value range, the training question will not be added to the proximal development zone.

Further, in the training method for autism language barrier based on adaptive learning scaffold, the step of predicting the question-answering correct rate of the user includes: establishing a prediction model, obtaining a user information feature and a training question feature, and inputting the user information feature and the training question feature into the prediction model; linearly combining the user information feature and the training question feature to obtain a first fused feature; obtaining a second fused feature by performing multi-head attention calculation on the first fused feature; calculating a question-answering correct rate of the user according to the second fused feature, a hidden vector, a user question-answering behavior data and an independence deviation value.

Further, in the training method for autism language barrier based on adaptive learning scaffold, the step of obtaining a second fused feature by performing multi-head attention calculation on the first fused feature and calculating a question-answering correct rate of the user according to the second fused feature, a hidden vector, a user question-answering behavior data and an independence deviation value includes: setting three parameters of multi-head attention as $Q$, $K$, $V=f$, and mapping $Q$, $K$, $V$ dimensionality reduction to n vector spaces, thereby obtaining $Q_i$, $K_i$, $V_i \in \mathbb{R}^{2d/n}$, where user information feature is $f_s \in \mathbb{R}^d$, the training question feature is $f_q \in \mathbb{R}^d$, $f=[f_s, f_q]$, R is a feature matrix, a feature dimension is d, a hidden vector dimension is k, and the number of head of multi-head attention is n; performing the multi-head attention calculation to obtain a fused feature o;

$$head_i = softmax\left(\frac{Q_i K_i}{\sqrt{2d/n}}\right) V_i$$

$$o = [head_0, head_1, \ldots, head_n]$$

introducing the hidden vector U, the user's question-answering behavior data h and the independence deviation value $b_s$, and calculating the predicted value $\hat{r}$ of the question-answering correct rate of the user through the following formula:

$$\hat{r} = softmax\left(W(o \times U^T) + b_s \times softmax(h) + b_q \times softmax(h)\right)$$

where $b_q \in \mathbb{R}^2$ and $W \in \mathbb{R}^{k \times 2}$ are linear layer parameters.

Further, in the training method for autism language barrier based on adaptive learning scaffold, the training of the prediction model is carried out by using a cross-entropy loss function as the loss function:

$$L = \frac{1}{N} \sum_i^N -[y_i \log(\hat{r}_i) + (1 - y_i)\log(1 - \hat{r}_i)]$$

where $y_i$ is a true value of the i-th training question.

Further, in the training method for autism language barrier based on adaptive learning scaffold, the step of classifying the training questions in the proximal development zone, adding the classified training questions to the main training task or branch training task includes:

Step S1 is randomly obtaining a group of training questions in the proximal development zone, and comparing the similarity between the group of training questions and historical questions.

Step S2 is setting a standard value of similarity. If the similarity between this group of training questions and historical questions is greater than or equal to the standard value, this group of training questions is added to the main training task. If the similarity between this group of training questions and historical questions is less than the standard value, this group of training questions is added to the branch training task.

Step S3 is repeating step S1 until all training questions in the proximal development zone are completely screened.

Moreover, the training method for autism language barrier based on adaptive learning scaffold further includes: providing adaptive prompt information during the training process, and the adaptive prompt information includes a pointing prompt, a teaching prompt and a bottoming prompt.

Furthermore, the training method for autism language barrier based on adaptive learning scaffold further includes that the user's guardian may manually set the training progress and training parameters, and may also undergo a training experience.

According to the second aspect of the present disclosure, there is also provided a training system for autism language barrier based on adaptive learning scaffold. The system includes: a language barrier assessment module, a potential level analysis module and a training path generating module.

The language barrier assessment module is configured to analyze and assess the state of the user before training and output an analysis result.

The potential level analysis module is configured to predict a question-answering correct rate of the user based on user information and training question information, and add training questions that meet the accuracy requirements to a proximal development zone.

The training path generating module is configured to obtain the analysis result output by the language barrier module and generate an initialized training path, and obtain the training questions in the proximal development zone to update the initialized training path.

Further, the training system for autism language barrier based on adaptive learning scaffold further includes an adaptive prompt module, an adaptive recommendation module and a parent-terminal self-regulation module.

The adaptive prompt module is configured to provide adaptive prompt information during the training process, and the adaptive prompt information includes a pointing prompt, a teaching prompt and a bottoming prompt.

The adaptive recommendation module is configured to self-recommend information related to autism.

The parent-terminal self-regulation module is configured to manually set a training progress and training parameters.

BRIEF DESCRIPTION OF THE DRAWINGS

In order to more clearly illustrate the technical solutions in the embodiments of the present disclosure, the accompanying drawings required in the embodiments will be briefly introduced below. Clearly, the accompanying drawings in the following description are only some embodiments of the present disclosure. Those of ordinary skill in the art can also obtain other drawings based on these drawings without making creative efforts.

DESCRIPTION OF THE EMBODIMENTS

Figure 1:
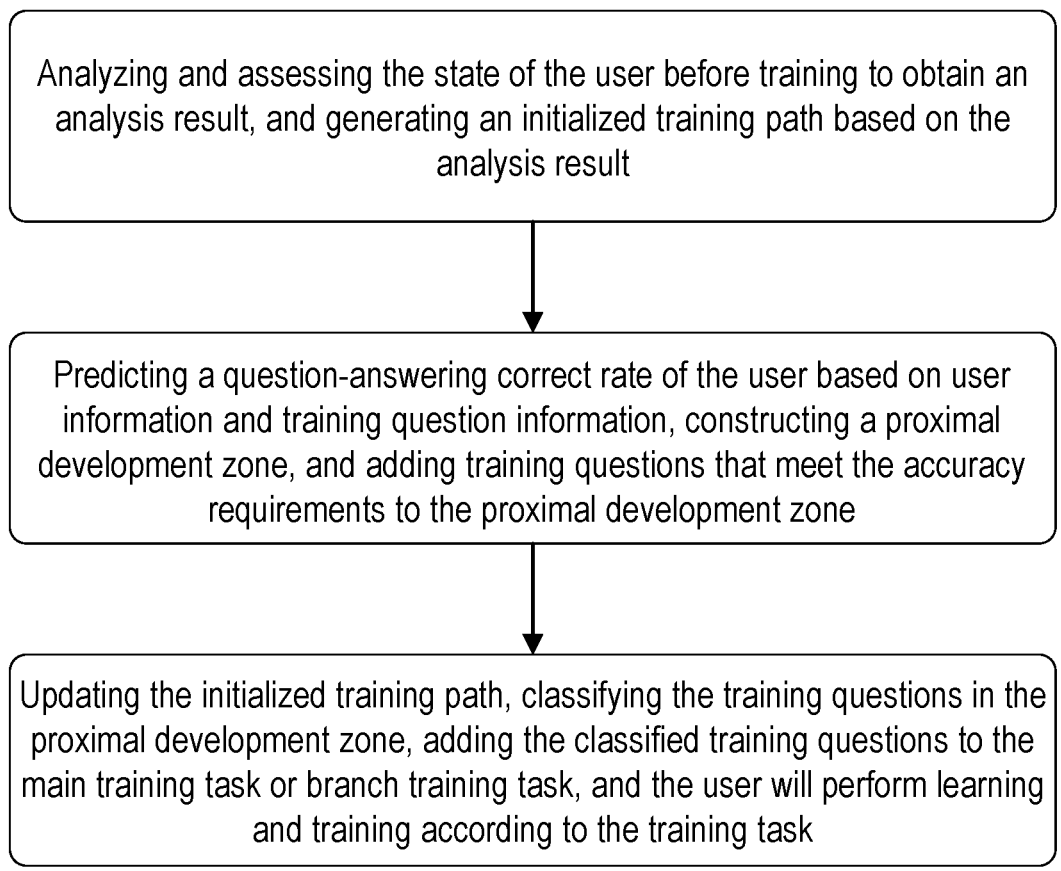
FIG. 1 is a schematic flow chart of a training method for autism language barrier based on adaptive learning scaffold provided in an embodiment of the present disclosure.

In order to make the object, technical solution and advantages of the present disclosure clearer, the present disclosure will be further described in detail below in conjunction with the accompanying drawings and embodiments. It should be understood that the specific embodiments described here are only used to explain the present disclosure, not to limit the present disclosure. In addition, the technical features involved in the various embodiments of the present disclosure described below can be combined with each other as long as they do not conflict with each other.

The terms "first", "second", "third" and the like in the description and claims of the present disclosure and accompanying drawings are adopted to distinguish different objects, rather than to describe a specific order. Furthermore, the terms "comprise" and "have", as well as any variations thereof, are intended to involve a non-exclusive inclusion. For example, a process, method, system, product or device comprising a series of steps or units is not limited to the listed steps or units, but optionally also includes unlisted steps or units, or optionally further includes other inherent steps or units in these processes, methods, products or devices.

The terms used in the present disclosure are explained below.

Scaffolding Theory: In the teaching process, teachers need to pay attention to the main activities of students, intervention in the learning process and provide appropriate learning scaffold when necessary, and "let go" in time when intervention is not necessary, so as to provide students with more opportunities for independent learning and exploration.

Adaptive learning scaffold: Adaptive learning scaffold is able to provide appropriate learning content for the next stage when learners respond correctly to the content to be learned, and also give adaptive prompt information when learners respond incorrectly to the content to be learned. In the whole teaching activity, the adaptive learning scaffold automatically recognizes the needs of the learners, provides personalized and adaptive scaffold strategies for them, and actively provides appropriate learning interventions to the learners.

Proximal development zone: Proximal development zone refers to the distance between the actual level of development and the potential level of development. The actual level of development refers to the current level of solving problem independently, and the potential level of development refers to the level of solving problem under the guidance of adults or with the help of more capable peers. The distance between the two is the possible interval for students to develop, and it is a level that has not yet been reached but is the mostly likely to be achieved.

Domain model: Domain model refers to the knowledge graph and expert experience in a specific field, and is configured to determine whether the learner's operation steps are appropriate.

Student model: Student model refers to the portrait of the current student, describing the current level of understanding and skill of the current learner.

Teaching model: Teaching model refers to customizing teaching strategies so that the system can provide reasonable tutoring behaviors.

Multi-head attention mechanism: The mechanism that uses multiple queries to calculate the importance features of input information in parallel.

On the one hand, the disclosure provides a training method for autism language barrier based on adaptive learning scaffold. FIG. 1 is a schematic flow chart of a training method for autism language barrier based on adaptive learning scaffold provided in an embodiment of the present disclosure. Referring to FIG. 1, the method includes the following steps:

Step (1) is analyzing and assessing the state of the user before training to obtain an analysis result, and generating an initialized training path based on the analysis result.

Specifically, the Autism Screening Scale and Language Impairment Assessment Scale are adopted to assess the state of autistic patients before intervention and training, specifically including autism symptom assessment and language impairment assessment. Patients are mainly screened and assessed through the Autism Screening Scale and the Language Impairment Assessment Scale. According to the content of the scale, the autistic patients are inquired question by question, and the autistic patients are assessed based on their responses.

Further, the feedback content of the symptom assessment of autism includes the assessment score, whether the child currently suffers from autism, the degree of illness, the overall condition assessment and suggestions, etc. The feedback content of the language barrier assessment includes the score of the current child's language status, written assessment and suggestions on four aspects, including phonetics, semantics, grammar, and pragmatics, and the written assessment and suggestions are comprehensively presented by description and radar chart.

In the follow-up, the initial training tasks and training paths may be adaptively generated according to the analysis results of autistic patients.

In a preferred embodiment, the Language Impairment Assessment Scale uses Chinese Communication Development Inventory (PCDI) as a standard for assessment.

Step (2) is predicting a question-answering correct rate of the user based on user information and training question information, constructing a proximal development zone, and adding training questions that meet the accuracy requirements to the proximal development zone.

Figure 2:
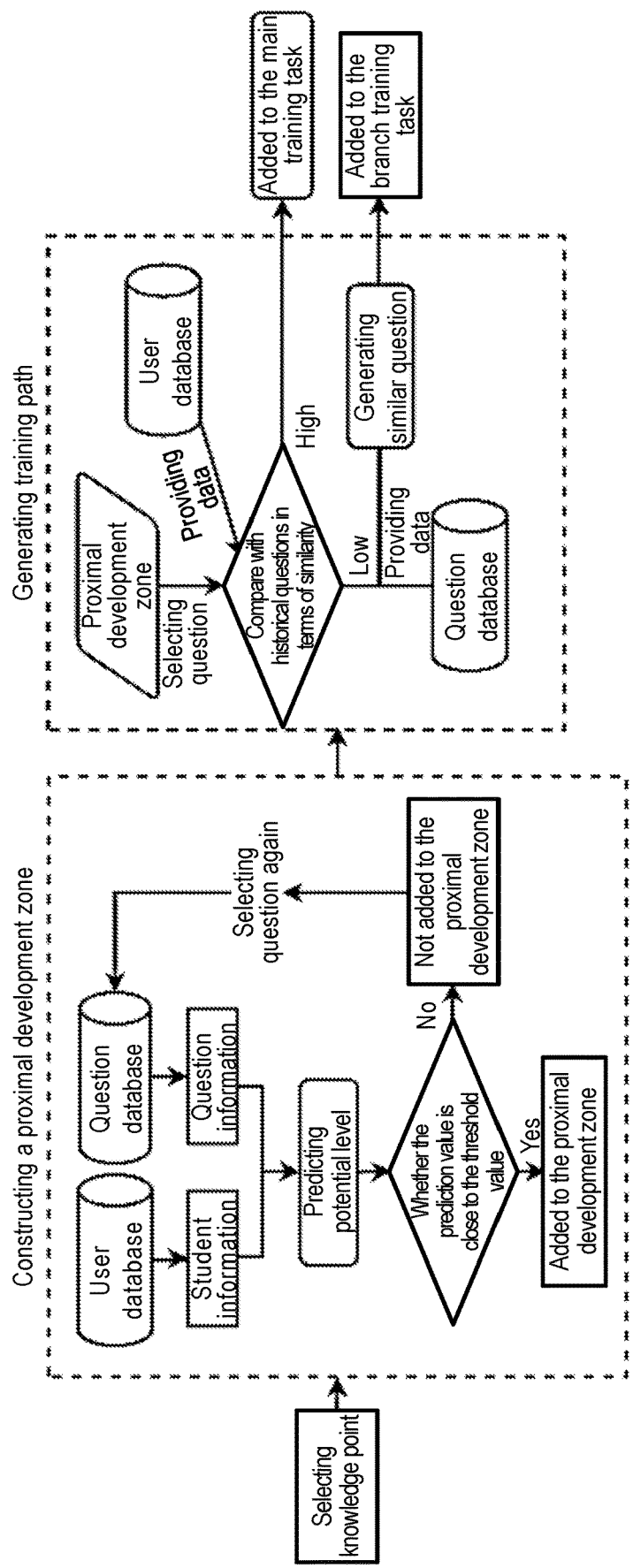
FIG. 2 is a schematic flow chart of the construction of a proximal development zone and the generation of a training path provided in an embodiment of the present disclosure.

FIG. 2 is a schematic flow chart of the construction of a proximal development zone and the generation of a training path provided in an embodiment of the present disclosure. Referring to FIG. 2, the training question information is obtained by accessing the training question database, and the training question information is obtained by accessing the user database. The question-answering correct rate of the user is predicted according to the user information and training question information, and proximal development zone is constructed. A value interval of the question-answering correct rate is set in advance. If the question-answering correct rate of the training question answered by the user falls within the preset value range, the training question will be added to the proximal development zone; if the question-answering correct rate of the training question answered by the user does not fall within the preset value range, the training question will not be added to the proximal development zone.

In a preferred embodiment, the user information is obtained through the student model, the appropriate teaching strategy is selected through the teaching model. Then, adaptive teaching instructions are issued, the knowledge content that needs to be mastered in the process of language impairment training for children with autism is stored through the domain model, and data transmission is carried out between and through the teaching model and student model.

It should be noted that the value range of question-answering correct rate is the reference data obtained after the machine learning model is trained. When the question-answering correct rate is higher than the value range, it means that the user may gain less from this group of training questions, and this group of training questions is not suitable as a training task for user training. When the question-answering correct rate of the user is lower than the value range, it means that the user's ability is temporarily insufficient, and this group of training questions is too difficult to be used as a training task for user training.

Figure 3:
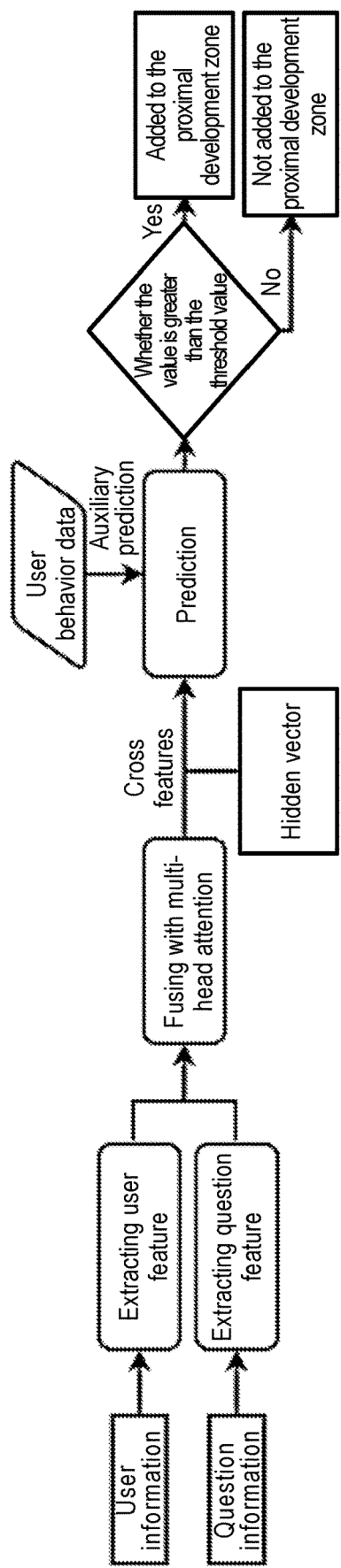
FIG. 3 is a schematic diagram of a multi-head attention mechanism provided in an embodiment of the present disclosure.

Further, predicting the question-answering correct rate of the user includes the following steps. FIG. 3 is a schematic diagram of a multi-head attention mechanism provided in an embodiment of the present disclosure. As shown in FIG. 3, in a preferred embodiment, through the multi-head attention mechanism, the student features and question features are fused, and hidden vectors are introduced to assist in interactive learning.

Also, the step includes establishing a prediction model, obtaining a user information feature and a training question feature, and inputting the user information feature and the training question feature into the prediction model; linearly combining the user information feature and the training question feature to obtain a first fused feature; obtaining a second fused feature by performing multi-head attention calculation on the first fused feature; calculating a question-answering correct rate of the user according to the second fused feature, a hidden vector, a user question-answering behavior data and an independence deviation value.

In a specific embodiment, a prediction model is constructed, user information feature $f_s$ and training question feature $f_q$ are obtained, where $f_s \in \mathbb{R}^d$, $f_q \in \mathbb{R}^d$, and hidden vector is set as $U \in \mathbb{R}^k$, where R is a feature matrix, the feature dimension is d, the hidden vector dimension is k, and the number of head of multi-head attention is n.

User information feature and training question feature are linearly combined to obtain the first fused feature f, $f=[f_s, f_q]$.

The three parameters of multi-head attention are set as $Q$, K, V=f, and $Q$, K, V are dimensionality reduced to n vector spaces, and $Q_i, K_i, V_i \in \mathbb{R}^{2d/n}$ is obtained.

Multi-head attention calculation is performed to obtain the second fused feature o;

$$head_i = softmax\left(\frac{Q_i K_i}{\sqrt{2d/n}}\right) V_i$$

$$o = [head_0, head_1, \ldots, head_n]$$

where the hidden vector U, the user's question-answering behavior data h and the independence deviation value $b_s$ are introduced, and the predicted value r̂ of the question-answering correct rate of the user is calculated through the following formula:

$$\hat{r} = softmax\left(W(o \times U^T) + b_s \times softmax(h) + b_q \times softmax(h)\right)$$

where $b_q \in \mathbb{R}^2$ and $W \in \mathbb{R}^{k \times 2}$ are linear layer parameters.

The historical behavior of students doing questions is introduced as display information when performing prediction, and the deviation value that can represent the independence of students and questions is introduced as implicit information for auxiliary prediction.

What needs to be explained is that different weights are set for different parts of the features of different users through the multi-head attention mechanism, so as to better distinguish user features.

The training of the prediction model is performed by using cross-entropy loss function as loss function:

$$L = \frac{1}{N} \sum_{i}^{N} -[y_i \log(\hat{r}_i) + (1 - y_i) \log(1 - \hat{r}_i)]$$

where $y_i$ is the true value of the i-th training question.

Step (3) is updating the initialized training path, classifying the training questions in the proximal development zone, adding the classified training questions to the main training task or branch training task, and the user will perform learning and training according to the training task.

Specifically, a group of training questions is randomly obtained from the proximal development zone, the user's historical question-answering records are obtained from the user database, and the similarity between the group of training questions and historical questions is compared. The similarity standard value is set, if the similarity between the group of training questions and historical questions is greater than or equal to the standard value, then this group of training questions is added to the main training task, if the similarity between this group of training questions and historical questions is less than the standard value, then this group of training questions is added to the branch training task, and the question database is accessed to find questions similar to the group of training questions, and the similar questions are also added to the branch training task. When using branch training tasks, it is possible to choose similar questions with similar difficulty as additional tasks (less difficult questions allow students to be more familiar with the question types and gain a sense of accomplishment; while more difficult questions may increase students' stability when encountering difficult questions) to selectively improve students' comprehensive ability. Preferably, the user needs to be re-assessed for prediction after completing a set of questions.

In a specific example, first the student information s and all question information Q in the proximal development zone are obtained; looping is performed on each question q in Q; the similarity between q and the children's history question H in s is calculated; if the similarity is high, q is added to R as the main training task; if the similarity is low, a small number of questions p in the question bank that are similar in difficulty and similar to H and q are searched, and p is added to the branch task set P; finally, the training task path R and the branch task set P are output.

Figure 4:
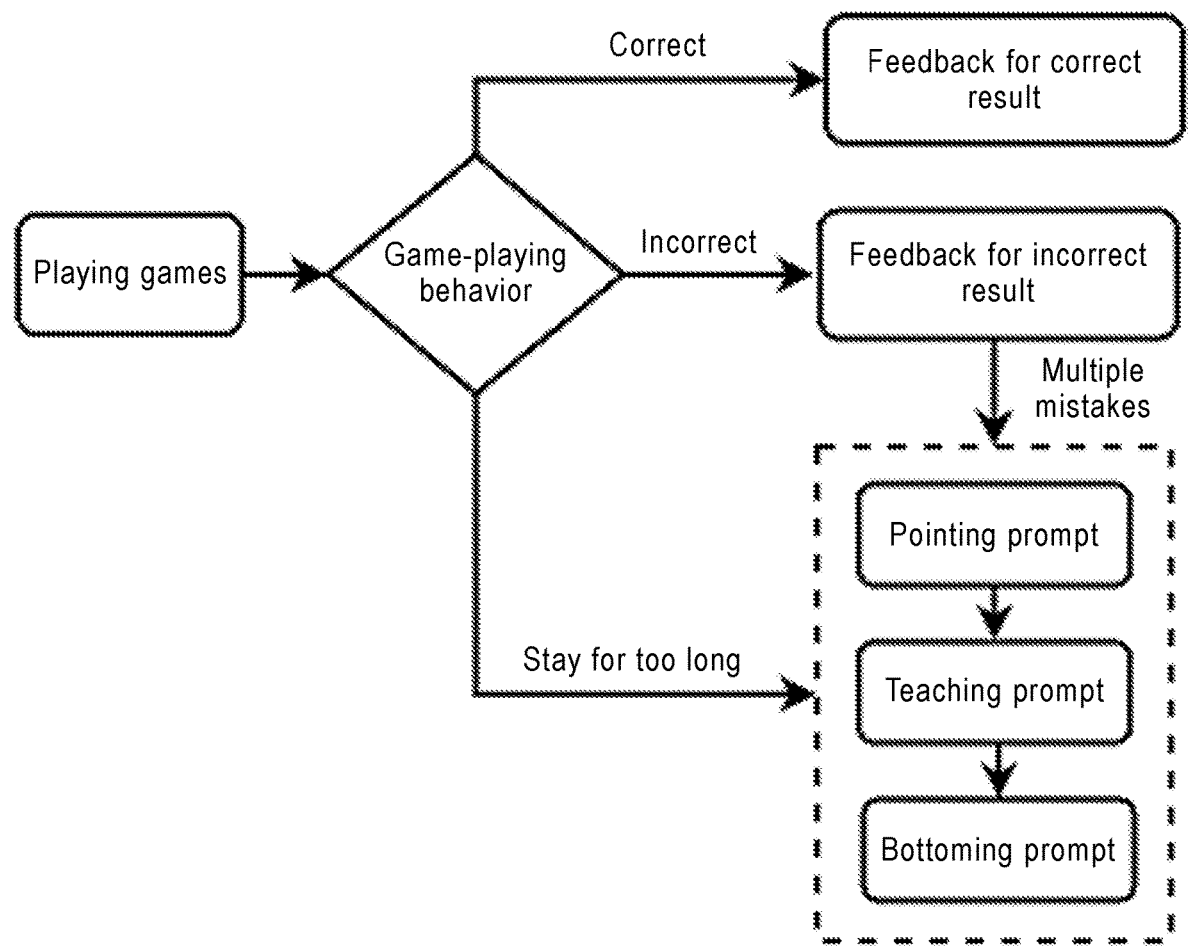
FIG. 4 is a schematic flow chart of an adaptive prompt information provided by an embodiment of the present disclosure.

Further, as shown in FIG. 4, adaptive prompt information is provided during the training process to meet the needs of different autistic patients. By using the "progressive prompt strategy", the prompt information is categorized into three levels, which are pointing prompts, teaching prompts and bottoming prompts. Pointing prompts are prompts that allow autistic patients to associate tasks with knowledge and give conceptual explanations. Teaching prompts briefly explain how to organize knowledge for application and give targeted explanations. Bottoming prompts are final prompts that directly give answers.

Preferably, the adaptive prompt information is fused with animal therapy to provide an expression form in which the school companion "Pony" is the prompter.

In an optional embodiment, the training questions are packaged in the form of games or animations to bring users a better experience.

Furthermore, the user's guardian may manually set the training progress and training parameters, and may also undergo training experience. The user may set the game progress and game settings, such as adjusting the volume of background music, setting daily game time limits, etc.

Furthermore, the method of the present disclosure may also recommend national policy information for children with autism, authoritative website links, authoritative expert videos, and other series of games.

Figure 5:
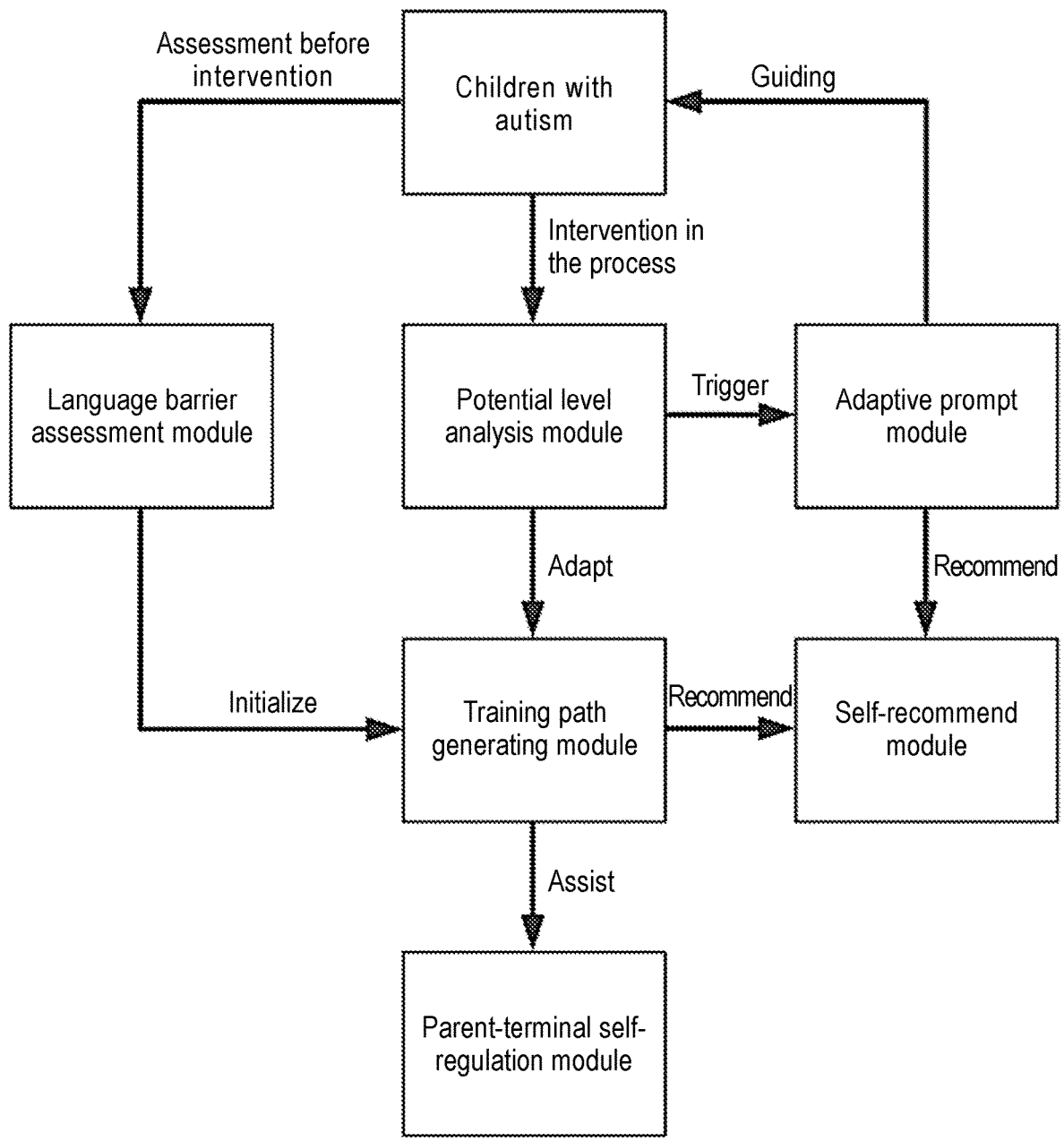
FIG. 5 is a schematic structural diagram of a training system for autism language barrier based on adaptive learning scaffold provided in an embodiment of the present disclosure.

On the other hand, the present disclosure provides a training system for autism language barrier based on adaptive learning scaffold. FIG. 5 is a schematic structural diagram of a training system for autism language barrier based on adaptive learning scaffold provided in an embodiment of the present disclosure. The system includes: a language barrier assessment module, a potential level analysis module, a training path generating module, an adaptive prompt module, an adaptive recommendation module and a parent-terminal self-regulation module.

The language barrier assessment module is configured to analyze and assess the state of the user before training and output an analysis result.

The potential level analysis module is configured to predict a question-answering correct rate of the user based on user information and training question information, and add training questions that meet the accuracy requirements to a proximal development zone.

The training path generating module is configured to obtain the analysis result output by the language barrier module and generate an initialized training path, and obtain the training question in the proximal development zone to update the initialized training path.

The adaptive prompt module is configured to provide adaptive prompt information during the training process, and the adaptive prompt information includes a pointing prompt, a teaching prompt and a bottoming prompt.

The adaptive recommendation module is configured to self-recommend information related to autism.

The parent-terminal self-regulation module is configured to manually set a training progress and training parameters.

In a preferred embodiment, the application scenario of the autism speech impairment training system is as follows. The autistic patient as a user logs in to the system, and the system interface presents a game selection page. The games are categorized into different levels of difficulty, and each level contains different types of modules that closely relate the content of the game to life knowledge. The phonetic game provides children with the correct pronunciation of the objects shown by means of intersections such as pointing and reading pictures, and displays a corresponding spelling to help children further familiarize themselves with the pronunciation. In the semantic game, through the prompt instructions issued by "Pony", such as "kid, let's touch the alarm clock!" to guide children to click on the corresponding items to improve children's cognitive ability. In the grammar game, children need to drag and drop pictures according to the prompts and in accordance with the order of instructions issued, so as to achieve the purpose of training the ability to understand word order. In the pragmatic game, interactions will be carried out with children through instructions in different scenarios, so as to train children's language logic ability and improve conversational skills. The school companion "Pony" will accompany the children throughout the game and monitor the children's question-answering situation during the games. When a child is stuck at a certain level for too long. "Pony" will issue a reminder instruction to guide the child to complete the level. When the child passes or fails several levels in a row, "Pony" will give praise, compliment or encouragement, encouraging feedback to increase the fun for children to play games. Throughout the training process, based on the adaptive learning scaffold, by focusing on the individual characteristics of children with autism, monitoring game-playing behaviour, diagnosing ability, and actively providing appropriate process feedback to children, it is possible to realize intelligent and personalized intervention. In addition, the backstage records the children's game performance. Parents may log in to the parent terminal to obtain information such as the progress, score, and time spent on the games played by the children, and adjust the game progress according to the actual situation of the children. In the meantime, game settings, such as adjusting the volume of background music, setting the daily game time limit, whether to enable the learning companion "Pony", the eye protection mode, etc. may be personalized.

Through the fusion of animal therapy and adaptive learning scaffold in the form of a learning partner, the "Pony" is able to maintain and stimulate the learning interest and attention of children with autism, and achieve better intervention training effects.

It should be noted that in the foregoing method embodiments, for the simplicity of description, the method embodiments are expressed as a series of action combinations, but those skilled in the art should know that the present disclosure is not limited to the described sequence of actions, because certain steps may be performed in other orders or simultaneously according to the present disclosure. Secondly, those skilled in the art should also know that the embodiments described in the specification belong to preferred embodiments, and the actions and modules involved are not necessarily required by this present disclosure.

In the foregoing embodiments, the descriptions of each embodiment have their own emphases, and for parts not described in detail in a certain embodiment, reference may be made to relevant descriptions of other embodiments.

In the several embodiments provided in this disclosure, it should be understood that the disclosed device may be implemented in other ways. For example, the device embodiments described above are only illustrative. For example, the division of the units is only a logical function division. In actual implementation, there may be other division methods. For example, multiple units or components can be combined or can be integrated into another system, or some features may be ignored, or not implemented. On the other hand, the mutual coupling or direct coupling or communication connection shown or discussed may be carried out through some service interfaces, and the indirect coupling or communication connection of devices or units may be carried out in electrical or other forms.

The units described as separate components may or may not be physically separated, and the components shown as units may or may not be physical units, that is, they may be located in one place, or may be distributed to multiple network units. Part or all of the units can be selected according to actual needs to achieve the purpose of the solution of this embodiment.

In addition, various functional units in various embodiments of the present disclosure may be integrated into one processing unit, each unit may exist separately physically, or two or more units may be integrated into one unit. The above-mentioned integrated units may be implemented in the form of hardware or in the form of software functional units.

If the integrated unit is realized in the form of a software function unit and sold or used as an independent product, it can be stored in a computer-readable memory. Based on this understanding, the technical solution of the present disclosure is essentially or part of the contribution to the related art, or all or part of the technical solution may be embodied in the form of a software product, and the computer software product is stored in a memory. Several instructions are included to make a computer device (which may be a personal computer, server or network device, etc.) execute all or part of the steps of the methods described in the various embodiments of the present disclosure. The above-mentioned memory includes: U disk, read-only memory (ROM), random access memory (RAM), mobile hard disk, magnetic disk or optical disk, and other media capable of storing program codes.

Those of ordinary skill in the art can understand that all or part of the steps in the various methods of the above-mentioned embodiments can be completed by entering a program to instruct related hardware. The program can be stored in a computer-readable memory, and the memory can include: flash memory disk, read-only memory (ROM), random access device (RAM), magnetic disk or optical disk, etc.

Generally speaking, compared with the related art, the above technical solutions conceived by the present disclosure are able to achieve the following advantageous effects.

(1) The training method and system for autism language barrier based on adaptive learning scaffold provided by the present disclosure predict the question-answering accuracy rate of the user according to user information and question information, add training questions that meet the accuracy requirements to the proximal development zone, classify the training questions in the proximal development zone, and add the classified training questions to the main training task or branch training task. The disclosure evaluates student's ability by predicting the question-answering correct rate of the user' and estimating the position in the proximal development zone, thereby recommending a suitable training path, and formulating training tasks that are suitable for the user's ability level. In this way, it is possible to meet users' needs for adaptive intervention and personalized training, while preventing negative effects caused by mismatched learning abilities of patients with autism during training.

(2) In the training method and system for autism language barrier based on adaptive learning scaffold provided by the present disclosure, by performing feature fusion through a multi-head attention mechanism, and introducing the hidden vector, the question-answering behavior data and the independence deviation to predict the question-answering accuracy rate of the user, the multi-head attention mechanism assigns different weights to different features, so it is possible to improve the accuracy rate of prediction.

(3) In the training method and system for autism language barrier based on adaptive learning scaffold provided by the present disclosure, assessment data in four aspects, including phonetics, semantics, grammar, and pragmatics of the autistic patients are obtained based on a scale, and data visualization is performed on the assessment result, thus realizing the comprehensive improvement of language ability of children with autism in four aspects, including speech impairment, semantic impairment, grammatical impairment and pragmatic impairment.

(4) In the training method and system for autism language barrier based on adaptive learning scaffold provided by the present disclosure, by setting the parent terminal to perform intervention and regulate the training progress according to the actual situation of the patient, and manually personalize game settings, the present disclosure combines human intervention with adaptive training to achieve better training results.

What is described above is only an exemplary embodiment of the present disclosure, and should not limit the scope of the present disclosure. That is, all equivalent changes and modifications made according to the teachings of the present disclosure still fall within the scope of the present disclosure. Embodiments of the present disclosure will be readily apparent to those skilled in the art from consideration of the specification and practice of the disclosure herein. This disclosure is intended to cover any modification, use or adaptation of the present disclosure, and these modifications, uses or adaptations follow the general principles of the present disclosure and include common knowledge or conventional technical means in the technical field not described in the present disclosure. The specification and examples are to be considered exemplary only, with the scope and spirit of the present disclosure defined by the claims.

The technical features of the above embodiments can be combined arbitrarily. To make the description concise, all possible combinations of the technical features in the above embodiments are not described. However, as long as there is no contradiction in the combination of these technical features, they should be considered to be within the scope described in this specification.

It is easy for those skilled in the art to understand that the above descriptions are only preferred embodiments of the present disclosure, and are not intended to limit the present disclosure. Any modifications, equivalent replacements and improvements made within the spirit and principles of the present disclosure should all be included within the scope of the present disclosure.

What is claimed is:

1. A training method for autism language barrier based on adaptive learning scaffold, comprising:

analyzing and assessing, by a processor, a state of a user before training to obtain an analysis result, and generating an initialized training path based on the analysis result;

obtaining, by the processor, training question information from a database, predicting a question-answering correct rate of the user by inputting user information and training question information to a prediction model, constructing a proximal development zone, and adding training questions that meet accuracy requirements to the proximal development zone, wherein the prediction model is trained by using a cross-entropy loss function and output a value as the question-answering correct rate for training questions obtained by accessing a training question database, wherein the processor is configured to compare the question-answering correct rate of each training questions obtained from the training question database to a predetermined value interval, and add the training questions having a value of the question-answering correct rate within the predetermined value interval to the proximal development zone, wherein predicting the question-answering correct rate of the user comprises:

establishing, by the processor, the prediction model, obtaining, by the processor, a user information feature and a training question feature, and inputting, by the processor, the user information feature and the training question feature into the prediction model;

linearly combining, by the processor, the user information feature and the training question feature to obtain a first fused feature;

obtaining, by the processor, a second fused feature by performing a multi-head attention calculation on the first fused feature;

calculating, by the processor, the question-answering correct rate of the user according to the second fused feature, a hidden vector, a user question-answering behavior data and an independence deviation value;

updating, by the processor, the initialized training path, classifying, by the processor, the training questions in the proximal development zone, adding, by the processor, the classified training questions to a main training task or a branch training task, and the processor is configured to output the main training task or the branch training task as adaptive teaching instructions to train the user, as to match the ability of the user under training.

2. He training method for autism language barrier based on adaptive learning scaffold according to claim 1, wherein constructing the proximal development zone comprises:
pre-setting, by the processor, a value range of the question-answering correct rate, wherein if the correct rate of a training question answered by the user falls within the value range, the training question is added to the proximal development zone; if the correct rate of the training question answered by the user does not fall within the value range, the training question is not added to the proximal development zone.

3. He training method for autism language barrier based on adaptive learning scaffold according to claim 1, wherein obtaining the second fused feature by performing the multi-head attention calculation on the first fused feature and calculating the question-answering correct rate of the user according to the second fused feature, the hidden vector, the user question-answering behavior data and the independence deviation value comprises:
setting, by the processor, three parameters of multi-head attention as Q, K, V=f, and mapping Q, K, V dimensionality reduction to n vector spaces, thereby obtaining $Q_i, K_j, V_i \in \mathbb{R}^{2d/n}$, wherein user information feature is $f_s \in \mathbb{R}^d$, the training question feature is $f_q \in \mathbb{R}^d$, $f=[f_s, f_q]$, R is a feature matrix, a feature dimension is d, a hidden vector dimension is k, and the number of head of the multi-head attention is n;
performing, by the processor, the multi-head attention calculation to obtain a fused feature o;

$$head_i = softmax\left(\frac{Q_i K_i}{\sqrt{2d/n}}\right) V_i$$

$$o = [head_0, head_1, \ldots, head_n]$$

introducing, by the processor, the hidden vector U, the user's question-answering behavior data h and the independence deviation value $b_s$, and calculating a predicted value $\hat{r}$ of the question-answering correct rate of the user through the following formula:

$$\hat{r} = softmax(W(o \times U^T) + b_s \times softmax(h) + b_q \times softmax(h))$$

wherein $b_q \in \mathbb{R}^2$ and $W \in \mathbb{R}^{k \times 2}$ are linear layer parameters.

4. He training method for autism language barrier based on adaptive learning scaffold according to claim 1, wherein a training of the prediction model is carried out by using a cross-entropy loss function as a loss function:

$$L = \frac{1}{N} \sum_i^N -[y_i \log(\hat{r}_i) + (1 - y_i) \log(1 - \hat{r}_i)]$$

wherein $y_i$ is a true value of an i-th training question.

5. He training method for autism language barrier based on adaptive learning scaffold according to claim 1, wherein classifying the training questions in the proximal development zone, adding the classified training questions to the main training task or the branch training task comprises:
S1. randomly obtaining, by the processor, a group of the training questions in the proximal development zone, and comparing a similarity between the group of the training questions and historical questions;
S2. setting, by the processor, a standard value of the similarity, wherein if the similarity between the group of the training questions and the historical questions is greater than or equal to the standard value, the group of the training questions are added to the main training task, if the similarity between the group of the training questions and the historical questions is less than the standard value, the group of the training questions are added to the branch training task;
S3. repeating, by the processor, step S1 until all of the training questions in the proximal development zone are completely screened.

6. He training method for autism language barrier based on adaptive learning scaffold according to claim 1, further comprising: providing, by the processor, adaptive prompt information during the training process, wherein the adaptive prompt information comprises a pointing prompt, a teaching prompt and a bottoming prompt.

7. He training method for autism language barrier based on adaptive learning scaffold according to claim 1, further comprising a user's guardian manually setting a training progress and training parameters, and undergoing a training experience.

8. A training system for autism language barrier based on adaptive learning scaffold, comprising: a language barrier assessment module, a potential level analysis module and a training path generating module; wherein
the language barrier assessment module, executed by a processor, is configured to analyze and assess a state of a user before training and output an analysis result;
the potential level analysis module, executed by the processor, is configured to predict a question-answering correct rate of the user by inputting user information and training question information from a database to a prediction model, and add training questions that meet accuracy requirements to a proximal development zone, wherein the prediction model is trained by using a cross-entropy loss function and output a value as the question-answering correct rate for training questions obtained by accessing a training question database, wherein the processor is configured to compare the question-answering correct rate of each training questions obtained from the training question database to a predetermined value interval, and add the training questions having a value of the question-answering correct rate within the predetermined value interval to the proximal development zone,
wherein predicting the question-answering correct rate of the user comprises:
establishing, by the processor, the prediction model, obtaining a user information feature and a training question feature, and inputting the user information feature and the training question feature into the prediction model;
linearly combining, by the processor, the user information feature and the training question feature to obtain a first fused feature;

obtaining, by the processor, a second fused feature by performing a multi-head attention calculation on the first fused feature;

calculating, by the processor, the question-answering correct rate of the user according to the second fused feature, a hidden vector, a user question-answering behavior data and an independence deviation value;

the training path generating module, executed by the processor, is configured to obtain the analysis result output by the language barrier module and generate an initialized training path, and obtain the training questions in the proximal development zone to update the initialized training path, and the processor is configured to output the main training task or the branch training task as adaptive teaching instructions to train the user, as to match the ability of the user under training.

9. The training system for autism language barrier based on adaptive learning scaffold according to claim 8, further comprising an adaptive prompt module, an adaptive recommendation module and a parent-terminal self-regulation module; wherein the adaptive prompt module is configured to provide adaptive prompt information during a training process, and the adaptive prompt information comprises a pointing prompt, a teaching prompt and a bottoming prompt;

the adaptive recommendation module is configured to self-recommend information related to autism;

the parent-terminal self-regulation module is configured to manually set a training progress and training parameters.

* * * * *